United States Patent
Park et al.

(10) Patent No.: US 7,916,620 B2
(45) Date of Patent: Mar. 29, 2011

(54) MULTI-USER DATA TRANSMISSION/RECEPTION SYSTEM AND MODE DETERMINATION METHOD

(75) Inventors: Chang Soon Park, Chungju-si (KR); Bruno Clerckx, Yongin-si (KR); Chun Kin Au Yeung, West Lafayette, IN (US); David J. Love, West Lafayette, IN (US); Seung Young Park, West Lafayette, IN (US); Il Han Kim, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 733 days.

(21) Appl. No.: 11/965,576

(22) Filed: Dec. 27, 2007

(65) Prior Publication Data

US 2008/0187060 A1 Aug. 7, 2008

(30) Foreign Application Priority Data

Feb. 2, 2007 (KR) ........................ 10-2007-0011279

(51) Int. Cl.
*H04B 7/02* (2006.01)
*H04B 15/00* (2006.01)
*H04L 27/26* (2006.01)

(52) U.S. Cl. .......... 370/203; 370/208; 370/329; 455/69; 455/501; 375/260

(58) Field of Classification Search .................. 370/203, 370/204, 208, 328, 329, 330; 455/69, 501, 455/562.1; 375/260, 267, 299
See application file for complete search history.

(56) References Cited

U.S. PATENT DOCUMENTS

| | | | |
|---|---|---|---|
| 7,702,029 B2 * | 4/2010 | Kotecha et al. | 375/267 |
| 2005/0265225 A1 | 12/2005 | Mahadevappa et al. | |
| 2006/0209764 A1 | 9/2006 | Kim et al. | |
| 2006/0209980 A1 | 9/2006 | Kim et al. | |
| 2007/0098106 A1 * | 5/2007 | Khojastepour et al. | 375/267 |

(Continued)

FOREIGN PATENT DOCUMENTS

KR   2004-85680   10/2004

(Continued)

OTHER PUBLICATIONS

Khaled et al, Quantized Multi-Mode Precoding for Spatial Multiplexing MIMO-OFDM Systems, 2005 IEEE, pp. 867-871.*

*Primary Examiner* — Chi H Pham
*Assistant Examiner* — Ahmed Elallam
(74) *Attorney, Agent, or Firm* — NSIP Law (57) ABSTRACT

A multi-user data transmission/reception system includes at least one mobile station to receive a pilot signal, select a preferred mode, a preceding matrix index, a beamforming vector index, and a quantized capacity level using the pilot signal, and transmit the preferred mode, the precoding matrix index, the beamforming vector index, and the quantized capacity level; and a base station to transmit the pilot signal to the at least one mobile station, receive the preferred mode, the precoding matrix index, the beamforming vector index, and the quantized capacity level from the at least one mobile station, and determine an optimal mode, an optimal precoding matrix, and an optimal beamforming vector using a lookup table storing an expected capacity for each capacity quantization interval.

25 Claims, 6 Drawing Sheets

U.S. PATENT DOCUMENTS

| | | | |
|---|---|---|---|
| 2007/0147536 A1* | 6/2007 | Melzer et al. | 375/267 |
| 2007/0160156 A1* | 7/2007 | Melzer et al. | 375/260 |
| 2007/0280116 A1* | 12/2007 | Wang et al. | 370/236 |
| 2008/0108310 A1* | 5/2008 | Tong et al. | 455/69 |
| 2008/0132281 A1* | 6/2008 | Kim et al. | 455/562.1 |
| 2008/0165875 A1* | 7/2008 | Mundarath et al. | 375/262 |
| 2010/0266054 A1* | 10/2010 | Mielczarek et al. | 375/260 |

FOREIGN PATENT DOCUMENTS

| | | |
|---|---|---|
| KR | 2005-43783 | 5/2005 |
| KR | 2006-22630 | 3/2006 |
| KR | 2006-51528 | 5/2006 |

\* cited by examiner

EACH OF AT LEAST ONE
MOBILE STATION SELECTS
PREFERRED MODE, PRECODING
MATRIX INDEX, BEAMFORMING
VECTOR INDEX, AND QUANTIZED
CAPACITY LEVEL

BASE STATION DETERMINES
OPTIMAL MODE, OPTIMAL
PRECODING MATRIX, AND
OPTIMAL BEAMFORMING
VECTOR

FIG. 5

FIG. 6

MULTI-USER DATA TRANSMISSION/RECEPTION SYSTEM AND MODE DETERMINATION METHOD

CROSS-REFERENCE TO RELATED APPLICATIONS

This application claims the benefit of Korean Patent Application No. 2007-11279 filed on Feb. 2, 2007, in the Korean Intellectual Property Office, the disclosure of which is incorporated herein by reference in its entirety.

BACKGROUND OF THE INVENTION

1. Field of the Invention

Aspects of the invention relate to a wireless data communication system. More particularly, aspects of the invention relate to a multi-user data transmission/reception system.

2. Description of the Related Art

Recently, various multimedia services such as a voice service are being provided in a wireless communication environment, and various studies are being conducted to support high-speed and high-quality data transmission in the wireless communication environment. For example, studies of Multiple-Input Multiple-Output (MIMO) systems using a channel in a spatial area are being conducted.

A MIMO system can acquire a channel capacity using a MIMO antenna in a channel environment where scattering is abundant, the channel capacity being in proportion to a fewer number of antennas, from a transmitting antenna and a receiving antenna.

In a multi-user environment where a single base station supports a plurality of terminals, studies regarding a MIMO antenna transmission technique are being conducted to improve all capacities of the MIMO system for multiple users.

There is a difference between the MIMO system for multiple users and a general MIMO system for a single user in that the multiple users transmit data to the same base station on an uplink, and the base station transmits signals to the multiple users on a downlink. Also, the multiple users cannot communicate with one another.

On a downlink channel, each of a plurality of users may receive other users' signals in addition to their own signal due to a signal interference problem that occurs because the base station simultaneously transmits signals to the plurality of users. A technique capable of preventing the signal interference problem may not be applicable to a mobile station due to complexity and costs. However, the signal interference problem can be mitigated by effectively designing a transmission signal in a transmitter of the base station.

Accordingly, a new method capable of selecting an effective transmission mode is required in a data transmission/reception system for multiple users.

SUMMARY OF THE INVENTION

An aspect of the invention relates to a multi-user data transmission/reception system that can provide advantages of a Multiple Input Multiple Output (MIMO) system, and can also improve a channel capacity for multiple users.

An aspect of the invention also relates to a multi-user data transmission/reception system that can reduce interference occurring due to multiple users.

An aspect of the invention also relates to a multi-user data transmission/reception system that can enhance freedom of selecting a transmission mode.

An aspect of the invention also relates a multi-user data transmission/reception system that can reduce overhead and system complexity.

According to an aspect of the invention, a multi-user data transmission/reception system includes at least one mobile station to receive a pilot signal, select a preferred mode, a precoding matrix index, a beamforming vector index, and a quantized capacity level using the pilot signal, and transmit the preferred mode, the preceding matrix index, the beamforming vector index, and the quantized capacity level; and a base station to transmit the pilot signal to the at least one mobile station, receive the preferred mode, the precoding matrix index, the beamforming vector index, and the quantized capacity level from the at least one mobile station, and determine an optimal mode, an optimal precoding matrix, and an optimal beamforming vector using a lookup table storing an expected capacity for each capacity quantization interval.

According to an aspect of the invention, the preferred mode may be a natural number of either one or a maximum number of data streams supported by the base station. A maximum number of data streams supported by the base station may be a number of receiving antennas in the base station. For example, when there are four receiving antennas in the base station, a maximum number of data streams supported by the base station may be four, and the preferred mode may be either one or four.

According to an aspect of the invention, the optimal mode may be any natural number from one to a number of data streams. A number of data streams may be a number of users receiving data. For example, when a number of users receiving data is four, a number of data streams may be four, and the optimal mode may be any natural number from one to four.

According to an aspect of the invention, the at least one mobile station calculates a single-user mode capacity and a multi-user mode capacity, and quantizes a greater one of the single-user mode capacity and the multi-user mode capacity to select the quantized capacity level.

According to an aspect of the invention, each one of the at least one mobile station, when calculating the multi-user mode capacity, estimates that each other one of the at least one mobile station contributes a same amount of capacity to the multi-user mode capacity that the one of the at least one mobile station contributes to the multi-user mode capacity.

According to an aspect of the invention, a mode determination method includes transmitting a pilot signal from a base station; receiving the pilot signal in at least one mobile station, selecting a preferred mode, a precoding matrix index, a beamforming vector index, and a quantized capacity level using the pilot signal in the at least one mobile station, transmitting the preferred mode, the preceding matrix index, the beamforming vector index, and the quantized capacity level from the at least one mobile station; receiving the preferred mode, the preceding matrix index, the beamforming vector index, and the quantized capacity level in the base station, and determining an optimal mode, an optimal preceding matrix, and an optimal beamforming vector using a lookup table storing an expected capacity for each capacity quantization interval in the base station.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will become apparent and more readily appreciated

DETAILED DESCRIPTION OF THE EMBODIMENTS

Reference will now be made in detail to embodiments of the invention, examples of which are shown in the accompanying drawings, wherein like reference numerals refer to like elements throughout. The embodiments are described below to explain the invention by referring to the figures.

Figure 1:
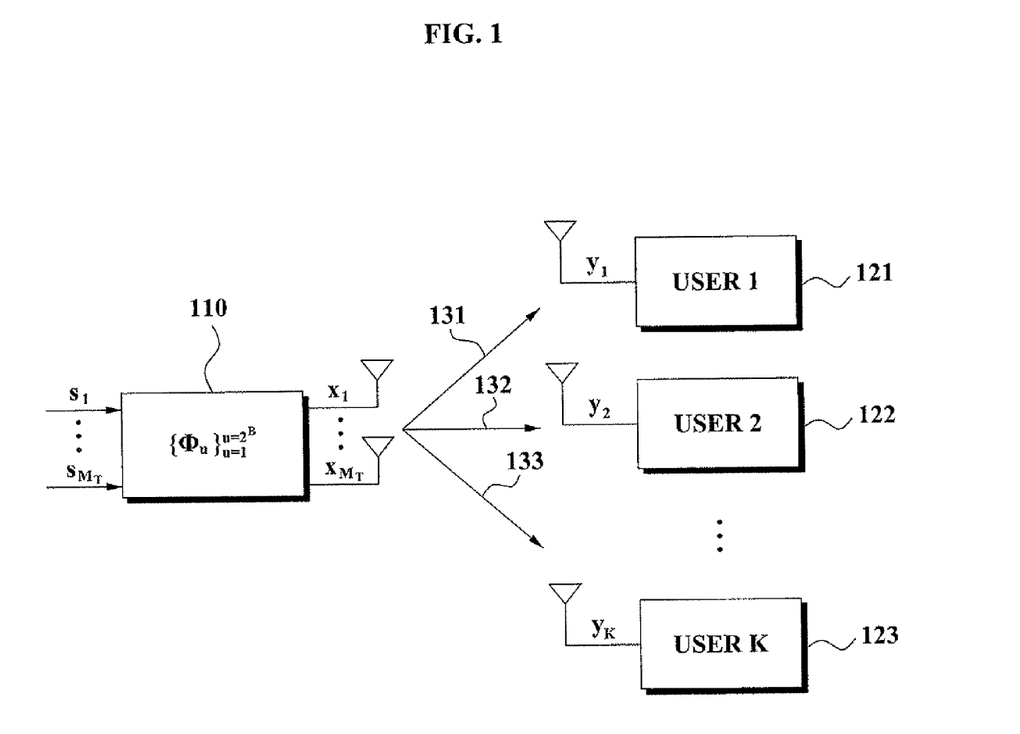
FIG. 1 is a block diagram of a data transmission/reception system according to an aspect of the invention.

FIG. 1 is a block diagram of a data transmission/reception system according to an aspect of the invention.

Referring to FIG. 11 the data transmission/reception system according to an aspect of the invention includes mobile stations 121, 122, and 123 respectively corresponding to users 1, 2, and 3, and a base station 110.

Each of the mobile stations 121, 122, and 123 selects a preferred mode, a preceding matrix index, a beamforming vector index, and a quantized capacity level using a pilot signal received from the base station 110 as indicated by arrows 131, 132, and 133, and transmits the preferred mode, the preceding matrix index, the beamforming vector index, and the quantized capacity level to the base station 110.

The base station 110 receives the preferred mode, the precoding matrix index, the beamforming vector index, and the quantized capacity level from each of the mobile stations 121, 122, and 123, and determines an optimal preceding matrix, an optimal beamforming vector, and an optimal mode using a lookup table storing an expected capacity for each capacity quantization interval. A capacity quantization interval is an interval between two capacity quantization levels. The lookup table is prepared in advance.

The base station 110 has $M_T$ antennas, and transmits the pilot signal to the mobile stations 121, 122, and 123 using a codebook made up of $2^B$ preceding matrices for a channel at a predetermined point in time.

A u-th preceding matrix is represented as $\phi_u$(u=1 to $2^B$). The precoding matrix is an $M_T$ by $M_T$ unitary matrix made up of $M_T$ beamforming vectors. An i-th beamforming vector is represented as $\phi_{ui}$(i=1 to $M_T$). A quantized capacity level is up to an L level for each mode. A quantized capacity level for a k-th user is represented as $l_k$.

Figure 2:
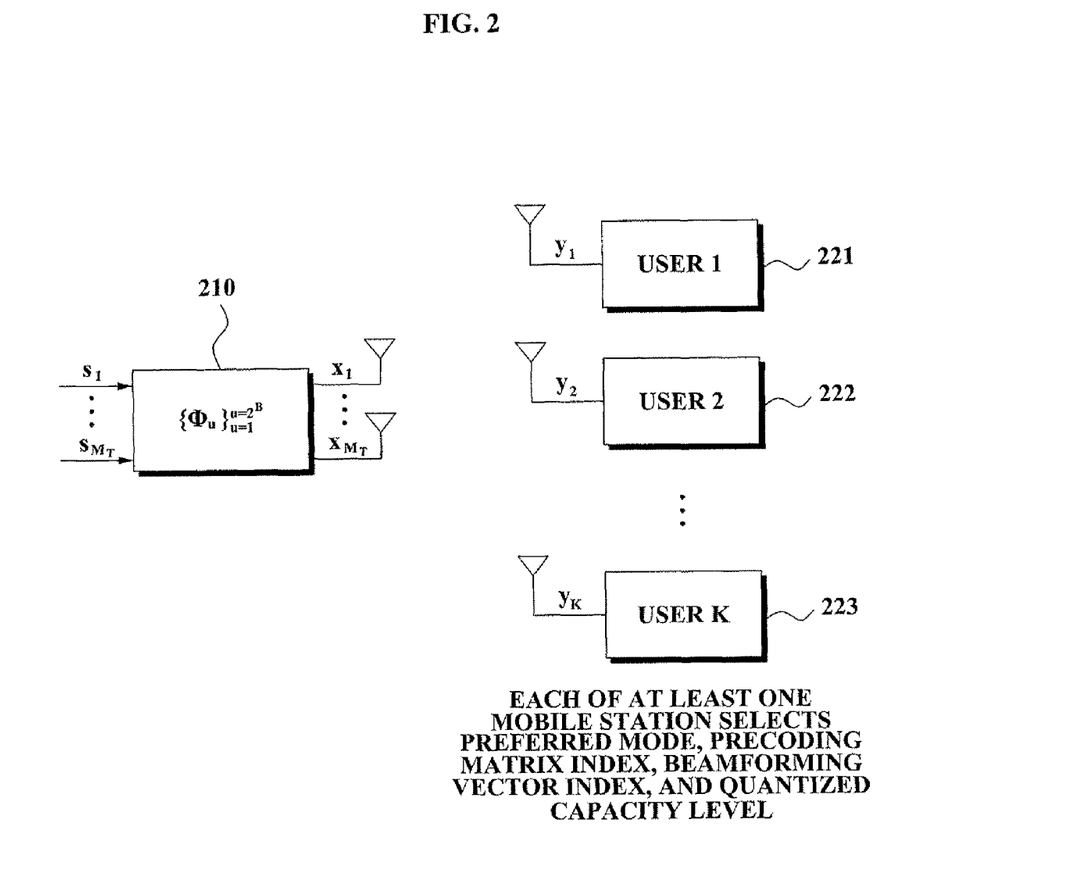
FIG. 2 shows an operation in which mobile stations each select a preferred mode in a data transmission/reception system according to an aspect of the invention.

FIG. 2 shows an operation in which mobile stations 221, 222, and 223 each select a preferred mode, a preceding matrix index, a beamforming vector, and a quantized capacity level in a data transmission/reception system according to an aspect of the invention.

Referring to FIG. 2, each of the mobile stations 221, 222, and 223 selects a preferred mode after calculating a transmission rate of all beamforming vectors for all modes of a channel at a predetermined point in time.

According to an aspect of the invention, a preferred mode $\tilde{m}_k$ of a k-th user may be a natural number of either one or a maximum number of data streams supported by the base station 210. A maximum number of data streams supported by the base station 210 may be a number of receiving antennas in the base station 210. For example, when there are four receiving antennas in the base station 210, a maximum number of data streams supported by the base station 210 may be four, and the preferred mode $\tilde{m}_k$ may either one or four.

According to an aspect of the invention, each of the mobile stations 221, 222, and 223 calculates a single-user mode capacity and a multi-user mode capacity, selects a mode corresponding to a greater one of the single-user mode capacity and the multi-user mode capacity as the preferred mode, and transmits the preferred mode to the base station 210 together with a precoding matrix index and a beamforming vector index corresponding to the greater one of the single-user mode capacity and the multi-user mode capacity, and a quantized capacity level.

According to an aspect of the invention, when the mobile station 221 calculates the multi-user mode capacity, it estimates that each of the mobile stations 222 and 223 contributes the same amount of capacity to the multi-user mode capacity that the mobile station 221 contributes to the multi-user mode capacity. The mobile stations 222 and 223 make the same estimation when they calculate the multi-user mode capacity.

According to an aspect of the invention, the single-user mode capacity is calculated using a power of a signal being transmitted via a selected channel that is obtained when the precoding matrix index and the beamforming vector index are selected so that the power of the signal being transmitted via the selected channel becomes a maximum, and the multi-user mode capacity is calculated using a value directly proportional to the power of the signal being transmitted via the selected channel and inversely proportional to a summed power of signals being transmitted via channels other than the selected channel.

When a power of a signal being transmitted via a channel using a beamforming vector $\phi_{ui}$ is $|h\phi_{ui}|^2$, and when a value obtained by dividing a total transmission power by a Gaussian noise power is $\rho$, a single-user mode capacity for a k-th user is represented by the following Equation 1:

$$C_k^1 = \log_2\left(1 + \max_{1 \le u \le 2^B} \max_{1 \le i \le M_T} \rho |h\phi_{ui}|^2\right) \quad (1)$$

and a multi-user mode capacity for the k-th user is represented by the following Equation 2:

$$C_k^{M_T} = \log_2\left(1 + \max_{1 \le u \le 2^B} \max_{1 \le i \le M_T} \frac{|h\phi_{ui}|^2}{\frac{M_T}{\rho} + \sum_{j \ne i} |h\phi_{uj}|^2}\right) \quad (2)$$

Each of the mobile stations 221, 222, and 223 may quantize the greater one of the single-user mode capacity and the multi-user mode capacity to select a quantized capacity level, and transmit the quantized capacity level to the base station 210.

The quantization is an L level quantization corresponding to $\{q_0 \text{ to } q_L=\infty\}$ for each mode $1 \leq \tilde{m} \leq M_T$, and may be designed so that a sum of ergodic capacities corresponding to each quantization level becomes a maximum.

For each mode $\tilde{m}$, a maximum of the L level quantized capacity is represented by the following Equation 3:

$$\gamma^* = \max_{1 \leq k \leq K} \max_{1 \leq u \leq 2^B} \max_{1 \leq i \leq M_T} \frac{|h\phi_{ui}|^2}{\frac{\tilde{m}}{\rho} + \sum_{j \neq i}^{\tilde{m}} |h\phi_{uj}|^2} \quad (3)$$

When a real number interval $R_l = [q_{l-1}, q_l]$ is defined, an ergodic capacity of a set of L quantization levels for each mode $\tilde{m}$ may be represented by the following Equation 4:

$$C = \sum_{\ell=1}^{L} \frac{P(\gamma^* \in R_l)}{P(\gamma \in R_l)} \int_{q_{l-1}}^{q_l} f_\gamma(\gamma) \log_2(1+\gamma) d\gamma \quad (4)$$

Here, $f_\gamma(\gamma)$ indicates a probability density function of y $\gamma$, and P( ) indicates a probability that an event in the parentheses will occur. The quantization may be designed using Equations 3 and 4. $\gamma$ denotes quantization parameter. $\gamma^*$ denotes optimized quantization parameter.

The mode selected by each of the mobile 221, 222, and 223 may be determined by a number of simultaneous data streams supported by the mobile station 221, 222, or 223. For example, when a mode selected by the mobile station 221 is one, operation of the base station 210 may be limited to transmitting data to only a single user at one time.

Figure 3:
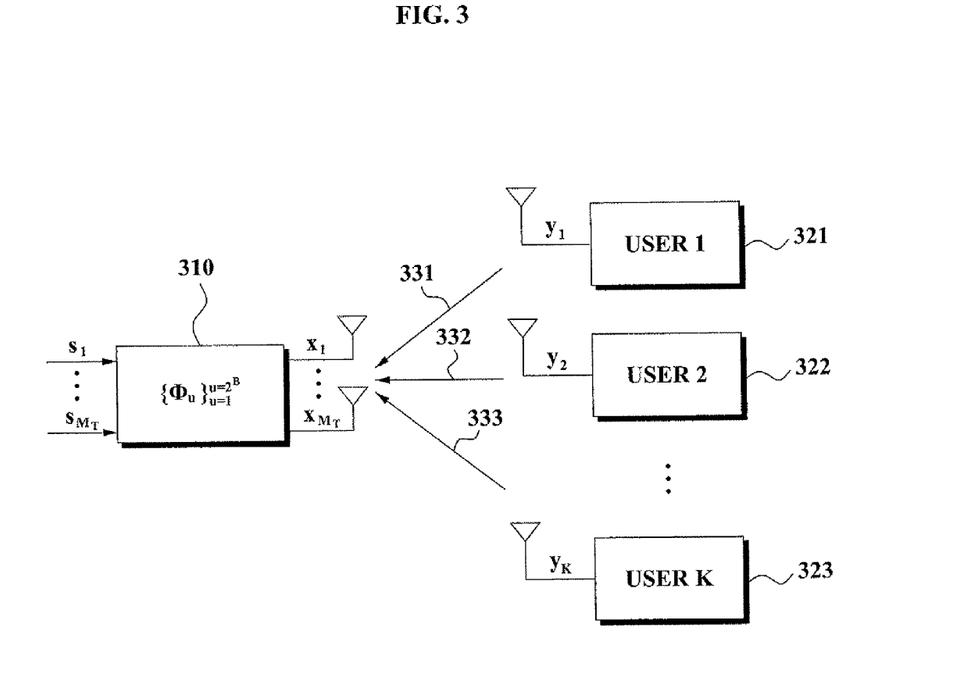
FIG. 3 shows an operation in which mobile stations each transmit information relating to a preferred mode to a base station in a data transmission/reception system according to an aspect of the invention.

FIG. 3 shows an operation in which mobile stations 321, 322, and 323 of a data transmission/reception system according to an aspect of the invention each transmit the preferred mode, the preceding matrix index, the beamforming vector index, and the quantized capacity level to a base station 310 as indicated by the arrows 331, 332, and 333.

For example, the mobile stations 321, 322, and 323 may transmit, for a k-th user mode, a preferred mode $\tilde{m}_k$, a precoding matrix index $u_k$, a beamforming vector index $i_k$, and a quantized capacity level $l_k$ to the base station 310.

According to an aspect of the invention, the mobile station may transmit at least one of a quantized signal-to-noise ratio (SNR) and a quantized signal-to-interference plus noise ratio (SINR) for downlink. Mobile station may calculate SINR based on estimation algorithm for interference due to other mobile stations.

Figure 4:
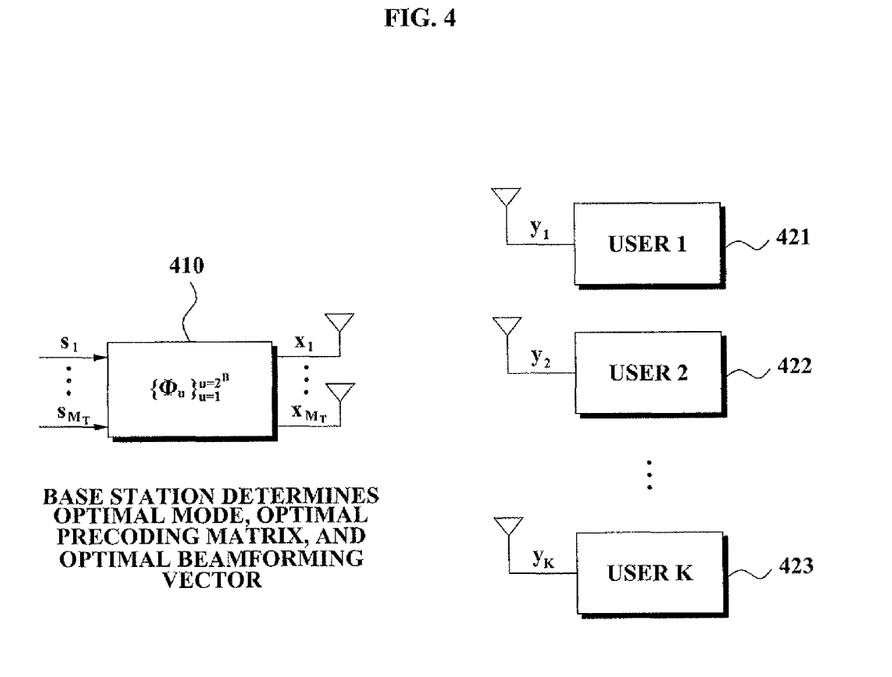
FIG. 4 shows an operation in which a base station selects an optimal mode in a data transmission/reception system according to an aspect of the invention.

FIG. 4 shows an operation in which a base station 410 of a data transmission/reception system according to an aspect of the invention determines an optimal mode, an optimal precoding matrix, and an optimal beamforming vector based on preferred mode information received from mobile stations 421, 422, and 423.

Referring to FIG. 4, the base station 410 determines the optimal mode, the optimal preceding matrix, and the optimal beamforming vector for a channel at a predetermined point in time based on the preferred mode information received from the mobile stations 421, 422, and 423.

According to an aspect of the invention, the base station 410 receives the preferred mode, the precoding matrix, the beamforming vector index, and the quantized capacity level from the base stations 421, 422, and 423, and determines an optimal mode, an optimal preceding matrix, and an optimal beamforming vector using a lookup table storing an expected capacity for each capacity quantization interval.

According to an aspect of the invention, the expected capacity stored in the lookup table is calculated for each capacity quantization interval for the single-user mode and the multi-user mode using respective probability density functions.

According to an aspect of the invention, the quantization is an L level quantization corresponding to $\{q_0 \text{ to } q_L=\infty\}$ and a maximum of the L level quantized capacity is calculated using Equation 3 described above.

According to an aspect of the invention, an ergodic capacity of a set of L quantization levels is calculated using Equation 4 described above.

According to an aspect of the invention, the quantization is designed using Equations 3 and 4.

According to an aspect of the invention, the expected capacity for the single-user mode that is stored in the lookup table is represented by the following Equation 5:

$$C_1(l) = \frac{1}{P(\gamma \in R_l)} \int_{q_{l-1}}^{q_l} f_\gamma(x) \log_2(1+x) dx \quad (5)$$

The expected capacity for the multi-user mode that is stored in the lookup table is represented by the following Equation 6:

$$C_{M_T}(\tilde{m}, l) = \frac{1}{P(\gamma_{\tilde{m}} \in R_l)} \int_{q_{l-1}}^{q_l} f_{\gamma_{\tilde{m}}}(x) \log_2(1+x) dx \quad (6)$$

The symbols $f_\gamma( )$ and $f_{\gamma_{\tilde{m}}}( )$ respectively indicate probability density functions of $\gamma$ and $\gamma_{\tilde{m}}$. The symbol $\gamma_{\tilde{m}}$ indicates an SINR of a user having m−1 interference signals.

For each unitary matrix u, it is assumed that a set of users that have selected a precoding matrix corresponding to u is $S_u$, a set of users that have selected the precoding matrix corresponding to u and a beamforming vector i is $S_{ui}$, and a mode of the precoding matrix corresponding to u and the beamforming vector i is $$\tilde{m}(S_{ui}) = \max_{k \in S_{ui}} \tilde{m}_k.$$

According to an aspect of the invention, a beamforming vector i* for a set $B_u$ of active beams of the preceding matrix corresponding to u is selected using the following Equation 7:

$$i^* = \underset{i \in B_u}{\operatorname{argmin}} \tilde{m}(S_{ui}) \quad (7)$$

The set $B_u$ of the active beams of the preceding matrix corresponding to u is represented by the following Equation 8:

$$B_u = [1 \ldots M_T] \quad (8)$$

A single-user mode and a multi-user mode satisfying the following Equation 9 can be identified for a set of users for the selected beamforming vector i*:

$$\tilde{m}(S_{ui}^*) \geq |B_u| \quad (9)$$

A procedure represented by $B_u = B_u - i^*$ is repeated for the selected $i^*$ until Equation 9 is satisfied to identify modes satisfying Equation 9.

The base station 410 refers to the lookup table when calculating the single-user mode capacity and the multi-user mode capacity. The lookup table is prepared in advance.

The single-user mode capacity is calculated in the base station 410 using the following Equation 10:

$$C_{u1} = \max_{k \in S_u : \tilde{m}_k = 1} C_1(l_k) \quad (10)$$

where $C_i(l_k)$ is obtained by referring to the lookup table prepared in advance.

The multi-user mode capacity is calculated in the base station 410 using the following Equation 11:

$$C_{u2} = \max_{1 \leq \tilde{m} \leq |B_u|} \max_{i_1, \ldots, i_{\tilde{m}} \in B_u} \sum_{\alpha=1}^{\tilde{m}} \max_{k \in S_{ui_\alpha} : \tilde{m}_k \geq \tilde{m}} C_{M_T}(\tilde{m}, l_k) \quad (11)$$

where $C_{M_T}(\tilde{m}, l_k)$ is obtained by referring to the lookup table prepared in advance.

The base station 410 determines a mode corresponding to a greater one of the calculated single-user mode capacity and multi-user mode capacity as the optimal mode, and determines a precoding matrix and a beamforming vector that correspond to a maximum expected capacity as the optimal preceding matrix and the optimal beamforming vector.

The optimal mode determined by the base station 410 may be any natural number from one to a number of data streams. A number of data streams may be a number of users receiving data. For example, when a number of users receiving data is four, a number of data streams may be four, and the optimal mode may be any natural number from one to four.

The base station 410 determines the set of users capable of optimizing a transmission mode.

An operation in which a base station optimizes a transmission mode will be described according to another aspect of the invention.

It is assumed that a precoding matrix codebook that is referred to by the base station 410 exclusively has a single unitary matrix $M_T = 4$, that is a 4×4 matrix. For each beamforming vector included in the unitary matrix, one user associated with one of the mobile stations selects a mode index $1(\tilde{m}_k = 1)$ by referring to a level of a quantized $|h\phi_{ui}|^2$, and three users associated with three other ones of the mobile stations select a mode index $4(\tilde{m}_k = M_T)$ by referring to a level of a quantized SINR.

Three vectors from four beamforming vectors are selected by the three users that have selected a mode index 4, and a fourth beamforming vector is selected by the one user that has selected the mode index 1. Possible transmission modes correspond to any one of (1) transmitting indexes of four beamforming vectors to all four of the users, (2) transmitting indexes of the three beamforming vectors to the three users that have selected the mode index 4, (3) transmitting indexes of the three beamforming vectors to two of the three users that have selected the mode index 4 after selecting the two users from the three users, with the two users corresponding to at least one of the front three beamforming vectors, and (4) exclusively transmitting index of any one of the four beamforming vectors to only the one user that has selected the mode index 1, with the one of the four beamforming vectors not being limited to the fourth beamforming vector.

An expected capacity is calculated for each of the possible transmission modes and capacity quantization interval, and a lookup table storing the expected capacities is used to obtain criteria for determining the transmission modes.

The base station sums up expected capacity entries of the lookup table corresponding to the possible transmission modes, and selects the optimal mode based on the sum of the expected capacities. For example, when a mode maximizing a quantized SINR stored in the lookup table is two, the base station selects two beamforming vectors to maximize an expected capacity. The base station selects an optimal mode by repeating the selecting of the transmission modes for the four possible transmission modes.

In the selecting of the transmission modes, a processing cost can be one of the criteria, and simplification of the selecting of the transmission modes can be another one of the criteria.

Figure 5:
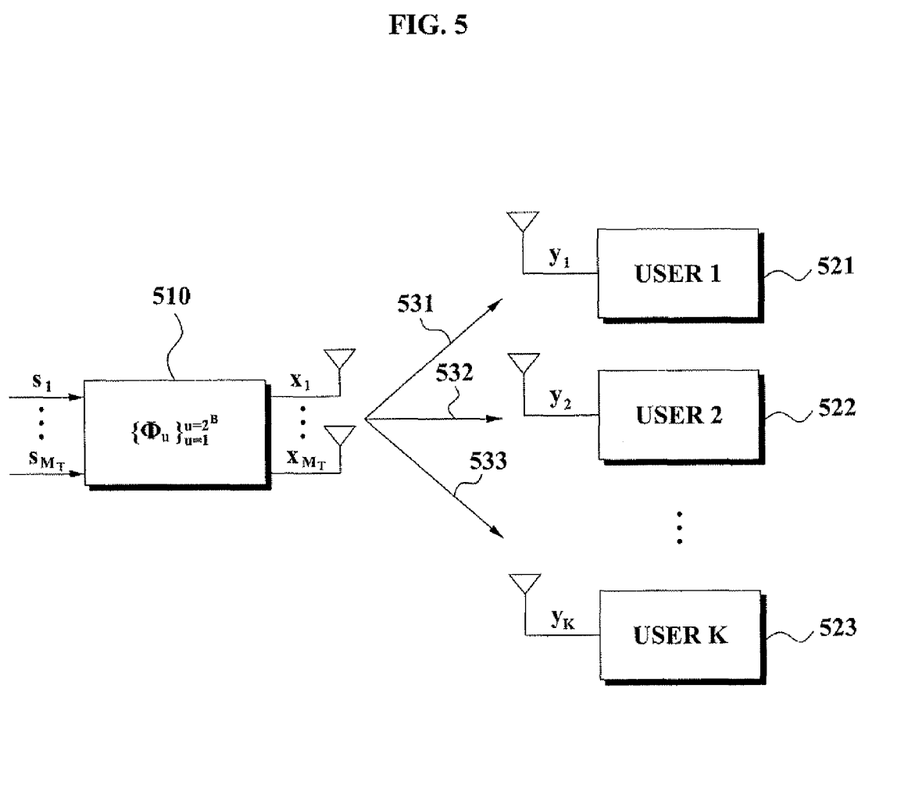
FIG. 5 shows an operation in which a base station transmits data to mobile stations according to the optimal mode in a data transmission/reception system according to according to an aspect of the invention.

FIG. 5 shows an operation in which a base station 510 transmits data to mobile stations 521, 522, and 523 according to an optimal mode in a data transmission/reception system according to an aspect of the invention.

Referring to FIG. 5, the base station 510 transmits data to the mobile stations 521, 522, and 523 according to the optimal mode, the optimal preceding matrix, and the optimal beamforming vector determined by the base station 510.

Figure 6:
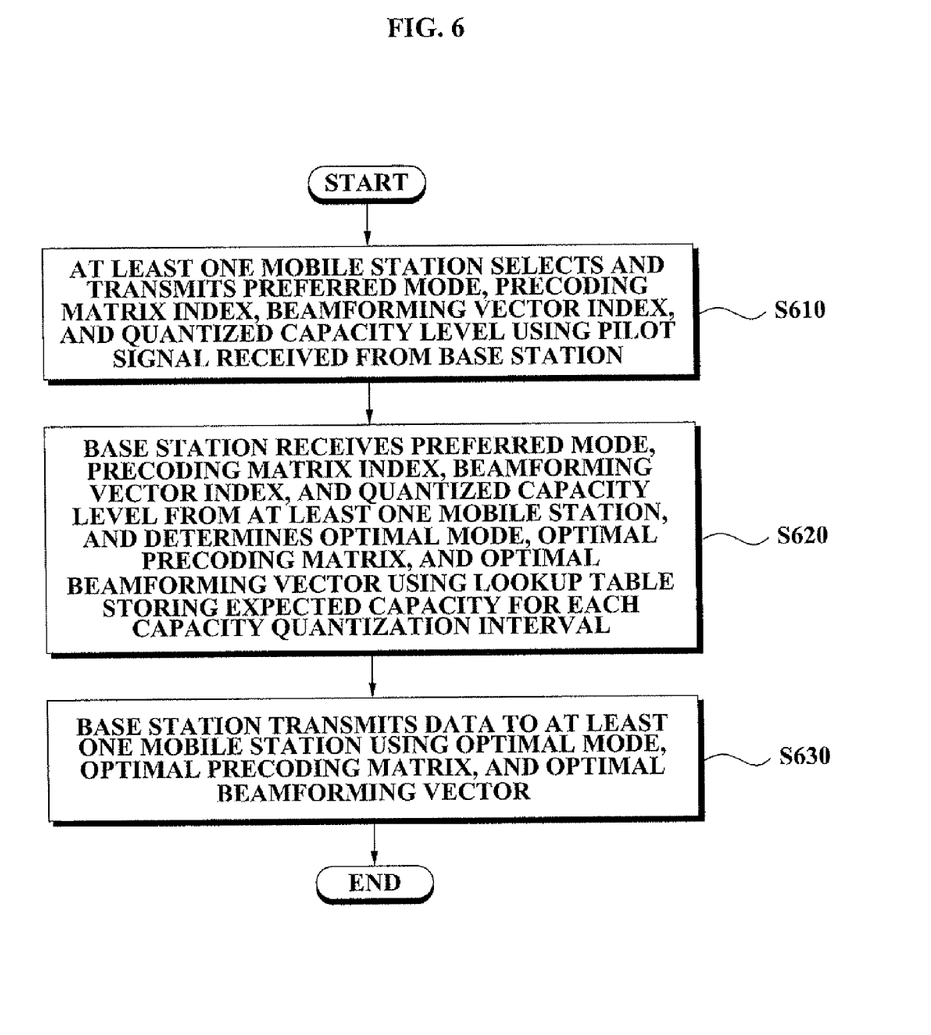
FIG. 6 is a flowchart of a mode determination method according to an aspect of the invention.

FIG. 6 is a flowchart of a mode determination method according to an aspect of the invention.

Referring to FIG. 6, in the mode determination method according to an aspect of the invention, at least one mobile station selects a preferred mode, a preceding matrix index, a beamforming vector index, and a quantized capacity level using a pilot signal received from a base station, and transmits the preferred mode, the precoding matrix index, the beamforming vector index, and the quantized capacity level to the base station in operation S610.

According to an aspect of the invention, the at least one mobile station calculates a single-user mode capacity and a multi-user mode capacity, and quantizes a greater one of the single-user mode capacity and the multi-user mode capacity to select the quantized capacity level.

According to an aspect of the invention, each one of the at least one mobile station, when calculating the multi-user mode capacity, estimates that each other one of the at least one mobile station contributes the same amount of capacity to the multi-user mode capacity that the one of the at least one mobile station contributes to the multi-user mode capacity.

According to an aspect of the invention, the single-user mode capacity is calculated using Equation 1 described above, and the multi-user mode capacity is calculated using Equation 2 described above.

According to an aspect of the invention, the at least one mobile station selects a mode corresponding to the greater one of the single-user mode capacity and the multi-user mode capacity as the preferred mode, and selects the precoding matrix index and the beamforming vector index corresponding to the greater one of the single-user mode capacity and the multi-user mode capacity.

The quantization is an L level quantization corresponding to $\{q_0$ to $q_L = \infty\}$, and a maximum of the L level quantized capacity is calculated using Equation 3 described above.

An ergodic capacity of a set of L quantization levels is calculated using Equation 4 described above.

The quantization is designed using Equations 3 and 4.

Also, in the mode determination method according to an aspect of the invention, a base station receives the preferred mode, the preceding matrix index, the beamforming vector index, and the quantized capacity level from the at least one mobile station, and determines an optimal mode, an optimal precoding matrix, and an optimal beamforming vector using a lookup table storing an expected capacity for each capacity quantization interval in operation S620.

The expected capacity stored in the lookup table is calculated for each capacity quantization interval for the single-user mode and the multi-user mode using respective probability density functions.

The quantization is an L level quantization corresponding to $\{q_0$ to $q_L=\infty\}$, and a maximum of the L level quantized capacity is calculated using Equation 3 described above.

An ergodic capacity of a set of L quantization levels is calculated using Equation 4 described above.

The quantization is designed using Equations 3 and 4.

The expected capacity for the single-user mode is calculated using Equation 5 described above, and is stored in the lookup table.

The expected capacity for the multi-user mode is calculated using Equation 6 described above, and is stored in the lookup table.

A beamforming vector i* is selected for a set $B_u$ of active beams of a preceding matrix corresponding to a unitary matrix u using Equation 7 described above.

The set $B_u$ of active beams of the precoding matrix corresponding to u is represented by Equation 8 described above.

A single-user mode and a multi-user mode satisfying Equation 9 described above can be identified for a set of users for the selected beamforming vector i*.

A procedure represented by $B_u=B_u=i*$ is repeated for the selected i* until Equation 9 is satisfied to identify modes satisfying Equation 9.

The base station refers to the lookup table when calculating the single-user mode capacity and the multi-user mode capacity. The lookup table is prepared in advance.

The single-user mode capacity is calculated in the base station using Equation 10 described above.

The multi-user mode capacity is calculated in the base station using Equation 11 described above.

The base station determines a mode corresponding to a greater one of the calculated single-user mode capacity and multi-user mode capacity as the optimal mode, and determines a precoding matrix and a beamforming vector that correspond to a maximum expected capacity as the optimal preceding matrix and the optimal beamforming vector.

Also, in the mode determination method according to an aspect of the invention, the base station transmits data to the at least one mobile station using the optimal mode, the optimal preceding matrix, and the optimal beamforming vector in operation S630.

A computer-readable medium may be encoded with processing instructions for implementing a mode determination method according to an aspect of the invention. The computer-readable medium may also be encoded with data files, data structures, and the like in addition to the processing instructions for implementing the mode determination method. Examples of suitable computer-readable media include magnetic media such as hard disks, floppy disks, and magnetic tape; optical media such as CD-ROMs and DVDs; magneto-optical media such as magneto-optical disks; and hardware devices that are specially configured to store processing instructions, such as read-only memory (ROM), random access memory (RAM), flash memory, and the like. Also, the processing instructions may also be embodied as a computer data signal in a carrier wave for transmission over a transmission medium such as optical or metallic lines, waveguides, the Internet, air, space, and the like. The computer data signal may also include data files, data structures, and the like in addition to the processing instructions for implementing the mode determination method. Examples of processing instructions include both machine code, such as machine code produced by a compiler, and higher level code that may be executed by the computer using an interpreter. The above-described hardware devices may be configured to act as one or more software modules to perform operations of the above-described aspects of the invention.

A multi-user data transmission/reception system according to an aspect of the invention provides advantages of a Multiple Input Multiple Output (MIMO) system and also improves a channel capacity for multiple users.

Also, a multi-user data transmission/reception system according to an aspect of the invention reduces interference occurring due to multiple users.

Also, a multi-user data transmission/reception system according to an aspect of the invention enhances freedom of selecting a transmission mode.

Also, a multi-user data transmission/reception system according to an aspect of the invention, reduces overhead and system complexity.

Although several embodiments of the invention have been shown and described it e appreciated by those skilled in the art that changes may be made in these embodiments without departing from the principles and spirit of the invention, the scope of defined in the claims and their equivalents.

What is claimed is:

1. A multi-user data transmission/reception system, comprising:
   at least one mobile station to:
      receive a pilot signal,
      generate a preferred mode, a preceding matrix index, a beamforming vector index, and a quantized capacity level using the pilot signal, and
      transmit the preferred mode, the precoding matrix index, the beamforming vector index, and the quantized capacity level; and
   a base station to:
      transmit the pilot signal to the at least one mobile station,
      receive the preferred mode, the preceding matrix index, the beamforming vector index, and the quantized capacity level from the at least one mobile station, and
      determine an optimal mode, an optimal precoding matrix, and an optimal beamforming vector using a lookup table storing an expected capacity for each capacity quantization interval.

2. The multi-user data transmission/reception system of claim 1, wherein the at least one mobile station:
   calculates a single-user mode capacity and a multi-user mode capacity, and
   quantizes a greater one of the single-user mode capacity and the multi-user mode capacity to select the quantized capacity level.

3. The multi-user data transmission/reception system of claim 2, wherein each one of the at least one mobile station, when calculating the multi-user mode capacity, estimates that each other one of the at least one mobile station contributes a same amount of capacity to the multi-user mode capacity that the one of the at least one mobile station contributes to the multi-user mode capacity.

4. The multi-user data transmission/reception system of claim 2, wherein the single-user mode capacity is calculated using a power of a signal being transmitted via a selected channel that is obtained when the precoding matrix index and the beamforming vector index are selected so that the power of the signal being transmitted via the selected channel becomes a maximum; and wherein the multi-user mode capacity is calculated using a value directly proportional to the power of the signal being transmitted via the selected channel and inversely proportional to a summed power of signals being transmitted via channels other than the selected channel.

5. The multi-user data transmission/reception system of claim 2, wherein the at least one mobile station:

selects a mode corresponding to the greater one of the single-user mode capacity and the multi-user mode capacity as the preferred mode, and selects a precoding matrix index and a beamforming vector index corresponding to the greater one of the single-user mode capacity and the multi-user mode capacity.

6. The multi-user data transmission/reception system of claim 1, wherein the base station:

calculates a single-user mode capacity and a multi-user mode capacity, and determines a mode corresponding to a greater one of the single-user mode capacity and the multi-user mode capacity as the optimal mode;

wherein the single-user mode capacity is calculated using the following equation:

$$C_{u1} = \max_{k \in S_u : \tilde{m}(k)=1} C_1(l_k)$$

where $S_u$ is a set of users that have selected a precoding matrix corresponding to u; and wherein the multi-user mode capacity is calculated using the following equation:

$$C_{u2} = \max_{1 \leq \tilde{m} \leq |B_u|} \max_{i_1,\ldots,i_{\tilde{m}} \in B_u} \sum_{\alpha=1}^{\tilde{m}} \max_{k \in S_{ui_\alpha} : \tilde{m}_k \geq \tilde{m}} C_{M_T}(\tilde{m}, l_k)$$

where $S_{ui}$ is a set of users that have selected the precoding matrix corresponding to u and a beamforming vector i, $$\tilde{m}(S_{ui}) = \max_{k \in S_{ui}} \tilde{m}_k$$

is a mode of the precoding matrix corresponding to u and the beamforming vector i, and $B_u$ is a set of active beams of the precoding matrix corresponding to u.

7. The multi-user data transmission/reception system of claim 6, wherein the base station determines a precoding matrix and a beamforming vector corresponding to a maximum expected capacity as the optimal precoding matrix and the optimal beamforming vector.

8. The multi-user data transmission/reception system of claim 1, wherein the quantization is an L level quantization corresponding to $\{q_0$ to $q_L=\infty\}$, and is designed so that a sum of ergodic capacities corresponding to each quantization level becomes a maximum.

9. The multi-user data transmission/reception system of claim 8, wherein the expected capacity stored in the lookup table is calculated for each capacity quantization interval for the single-user mode and the multi-user mode using respective probability density functions.

10. The multi-user data transmission/reception system of claim 1, wherein the preferred mode is a natural number of either one or a maximum number of data streams supported by the base station.

11. The multi-user data transmission/reception system of claim 1, wherein the optimal mode is any natural number from one to a number of data streams.

12. The multi-user data transmission/reception system of claim 1, wherein the base station transmits data to the at least one mobile station according to the optimal mode, the optimal precoding matrix, and the optimal beamforming vector.

13. A mode determination method, comprising:

transmitting a pilot signal from a base station;

receiving the pilot signal in at least one mobile station;

selecting a preferred mode, a precoding matrix index, a beamforming vector index, and a quantized capacity level using the pilot signal in the at least one mobile station;

transmitting the preferred mode, the precoding matrix index, the beamforming vector index, and the quantized capacity level from the at least one mobile station;

receiving the preferred mode, the precoding matrix index, the beamforming vector index, and the quantized capacity level in the base station; and determining an optimal mode, an optimal preceding matrix, and an optimal beamforming vector using a lookup table storing an expected capacity for each capacity quantization interval in the base station.

14. The mode determination method of claim 13, wherein the selecting of the quantized capacity level comprises:

calculating a single-user mode capacity and a multi-user mode capacity; and quantizing a greater one of the single-user mode capacity and the multi-user mode capacity to select the quantized capacity level.

15. The mode determination method of claim 14, wherein the calculating of the multi-user mode capacity comprises estimating, in each one of the at least one mobile station, that each other one of the at least one mobile station contributes a same amount of capacity to the multi-user mode capacity that the one of the at least one mobile station contributes to the multi-user mode capacity.

16. The mode determination method of claim 14, wherein the calculating of the single-user mode capacity is performed using a power of a signal being transmitted via a selected channel that is obtained when the preceding matrix index and the beamforming vector index are selected so that the power of the signal being transmitted via the selected channel becomes a maximum; and wherein the calculating of the multi-user mode capacity is performed using a value directly proportional to the power of the signal being transmitted via the selected channel and inversely proportional to a summed power of signals being transmitted via channels other than the selected channel.

17. The mode determination method of claim 14, wherein the selecting of the preferred mode, the precoding matrix index, and the beamforming vector index comprises:

selecting a mode corresponding to the greater one of the single-user mode capacity and the multi-user mode capacity as the preferred mode; and selecting a precoding matrix index and a beamforming vector index corresponding to the greater one of the single-user mode capacity and the multi-user mode capacity.

18. The mode determination method of claim 13, wherein the determining of the optimal mode, the optimal precoding matrix, and the optimal beamforming vector comprises:
calculating a single-user mode capacity and a multi-user mode capacity; and
determining a mode corresponding to a greater one of the single-user mode capacity and the multi-user mode capacity as the optimal mode;
wherein the single-user mode capacity is calculated using the following equation:

$$C_{u1} = \max_{k \in S_u : \tilde{m}(k)=1} C_1(l_k)$$

where $S_u$ is a set of users that have selected a precoding matrix corresponding to u; and
wherein the multi-user mode capacity is calculated using the following equation:

$$C_{u2} = \max_{1 \leq \tilde{m} \leq |B_u|} \max_{i_1,\ldots,i_{\tilde{m}} \in B_u} \sum_{\alpha=1}^{\tilde{m}} \max_{k \in S_{ui_\alpha} : \tilde{m}_k \geq \tilde{m}} C_{M_T}(\tilde{m}, l_k)$$

where $S_{ui}$ is a set of users that have selected the precoding matrix corresponding to u and a beamforming vector i, $$\tilde{m}(S_{ui}) = \max_{k \in S_{ui}} \tilde{m}_k$$

is a mode of the precoding matrix corresponding to u and beamforming vector i, and $B_u$ is a set of active beams of the precoding matrix corresponding to u.

19. The mode determination method of claim 18, wherein the determining of the optimal precoding matrix and the optimal beamforming vector comprises determining a precoding matrix and a beamforming vector corresponding to a maximum expected capacity as the optimal precoding matrix and the optimal beamforming vector.

20. The mode determination method of claim 13, wherein the quantization is an L level quantization corresponding to $\{q_0 \text{ to } q_L=\infty\}$, and is designed so that a sum of ergodic capacities corresponding to each quantization level becomes a maximum.

21. The mode determination method of claim 20, wherein the expected capacity stored in the lookup table is calculated for each capacity quantization interval for the single-user mode and the multi-user mode using respective probability density functions.

22. The mode determination method of claim 13, wherein the preferred mode is a natural number of either one or a maximum number of data streams supported by the base station.

23. The mode determination method claim 13, wherein the optimal mode is any natural number from one to a number of data streams.

24. The mode determination method of claim 13, further comprising transmitting data from the base station to the at least one mobile station according to the optimal mode, the optimal precoding matrix, and the optimal beamforming vector.

25. A non-transitory computer-readable medium encoded with processing instructions for implementing a mode determination method performed by a computer, the method comprising:
transmitting a pilot signal from a base station;
receiving the pilot signal in at least one mobile station;
selecting a preferred mode, a precoding matrix index, a beamforming vector index, and a quantized capacity level using the pilot signal in the at least one mobile station;
transmitting the preferred mode, the preceding matrix index, the beamforming vector index, and the quantized capacity level from the at least one mobile station;
receiving the preferred mode, the precoding matrix index, the beamforming vector index, and the quantized capacity level in the base station; and
determining an optimal mode, an optimal precoding matrix, and an optimal beamforming vector using a lookup table storing an expected capacity for each capacity quantization interval in the base station.

* * * * *